(12) United States Patent
Abouraddy et al.

(10) Patent No.: US 9,740,031 B2
(45) Date of Patent: Aug. 22, 2017

(54) INCOHERENTLY-INDUCED COHERENT PERFECT ABSORPTION (CPA) APPARATUS, METHOD, AND APPLICATIONS THEREOF

(71) Applicant: UNIVERSITY OF CENTRAL FLORIDA RESEARCH FOUNDATION, INC., Orlando, FL (US)

(72) Inventors: Ayman F. Abouraddy, Orlando, FL (US); Lorelle N. Pye, Orlando, FL (US); Massimo Maximilian L. Villinger, Orlando, FL (US); Soroush Shabahang, Orlando, FL (US); Walker D. Larson, Orlando, FL (US); Lane Martin, Orlando, FL (US)

(73) Assignee: UNIVERSITY OF CENTRAL FLORIDA RESEARCH FOUNDATION, INC., Orlando, FL (US)

(*) Notice: Subject to any disclaimer, the term of this patent is extended or adjusted under 35 U.S.C. 154(b) by 0 days.

(21) Appl. No.: 15/068,960

(22) Filed: Mar. 14, 2016

(65) Prior Publication Data
US 2017/0139238 A1    May 18, 2017

Related U.S. Application Data

(60) Provisional application No. 62/255,765, filed on Nov. 16, 2015.

(51) Int. Cl.
*G02F 1/01* (2006.01)

(52) U.S. Cl.
CPC ................. *G02F 1/0126* (2013.01)

(58) Field of Classification Search
CPC .................... G02F 1/0126; G02F 1/0063
See application file for complete search history.

(56) References Cited

U.S. PATENT DOCUMENTS

2012/0134002 A1* 5/2012 Stone ............... G02F 1/015
                                                        359/244

OTHER PUBLICATIONS

Li, Sucheng, et al. "Broadband perfect absorption of ultrathin conductive films with coherent illumination: super performance of electromagnetic absorption." arXiv preprint arXiv:1406.1847 (2014), pp. 1-27.

\* cited by examiner

*Primary Examiner* — Joseph P Martinez
(74) *Attorney, Agent, or Firm* — Bond, Schoeneck & King, PLLC; William Greener

(57) ABSTRACT

A thin film photonic structure that enables segregation of the effective absorption of the thin film and its intrinsic absorption while substantially eliminating bandwidth restrictions. In the form of an optical resonator, the structure includes two, multi-layer, aperiodic dielectric mirrors and a lossy, dielectric thin film and characterized by an intrinsic optical absorption over at least a one octave bandwidth. The two, multi-layer, aperiodic dielectric mirrors are characterized by a reflectivity amplitude that increases in-step with increasing wavelength over the at least one octave bandwidth. Upon a single incoherent beam of optical radiation having a spectrum over the at least one octave bandwidth incident on one side of the resonator structure, the lossy, dielectric thin film is characterized by an effective optical absorption over the at least one octave bandwidth that is greater than the intrinsic optical absorption over the at least one octave bandwidth.

6 Claims, 7 Drawing Sheets

INCOHERENTLY-INDUCED COHERENT PERFECT ABSORPTION (CPA) APPARATUS, METHOD, AND APPLICATIONS THEREOF

RELATED APPLICATION DATA

This application claims priority to U.S. provisional patent application Ser. No. 62/255,765 filed 16 Nov. 2015, the subject matter of which is incorporated by reference herein in its entirety.

GOVERNMENT FUNDING

Funding for the invention was provided by the US Air Force Office of Scientific Research (AFOSR) under contract FA-9550-12-1-0148 and AFOSR MURI contract FA9550-14-1-0037. The U.S. government has certain rights in the invention.

BACKGROUND

Aspects and embodiments of the invention generally pertain to optical apparatus enabling incoherently-induced Coherent Perfect Absorption (CPA), and associated methods and applications thereof. More particularly, aspects and embodiments apply to all linear, lossy, planar photonic structures regardless of the details of their construction. Most particularly, an exemplary, non-limiting device architecture includes a dielectric film placed between two lossless mirrors to form a symmetric or asymmetric resonator realizing complete absorption using an incoherent optical beam over an octave of bandwidth.

Coherent perfect absorption (CPA) is a relatively new optical scheme that produces high absorption in systems that have low intrinsic losses. CPA is the phenomenon where a linear system with low intrinsic loss strongly absorbs two incident beams, but only weakly absorbs either beam when incident separately. By interfering two beams in a lossy material (typically contained in a multi-pass interferometer such as a Fabry-Perot (FP) resonator), increased absorption is observed with respect to that experienced by each beam separately. The effect appears counter-intuitive: while a single beam is weakly absorbed, adding a second beam results in both beams being completely absorbed. This linear phenomenon has been termed 'lasing-in-reverse' and studied in terms of the mathematical behavior of the poles and zeros of the system scattering matrix.

Silicon (Si) occupies a privileged position in modern micro-technologies and is now playing a growing role in photonics. Therefore, the ability to control the physical properties of Si, e.g., its optical absorption, could have a profound impact on a variety of applications; for instance, increasing the photodetection efficiency in Si would enable the use of a thin layer, which would lead to an increase in detection speed, while extending its optical absorption into the near-infrared (NIR) would allow harnessing an under-utilized portion of the solar spectrum.

A variety of strategies to achieve these goals have been reported. To increase absorption, Si has been placed in cavities to resonantly enhance photodetection. To red-shift the absorption cut-off wavelength, the electronic bandgap of Si has been reduced by applying high pressures that modify the lattice structure. More recently, insights offered by the burgeoning study of non-Hermitian photonic structures are enabling new capabilities by controlling the spatial distribution of the imaginary refractive index component, whether loss or gain. One such insight utilizes interference to increase absorption in low-loss materials so-called 'coherent perfect absorption' (CPA). The CPA concept is related to that of 'critical coupling,' well-known in microwave engineering, wherein light coupled to a cavity is strongly absorbed on resonance. CPA is now envisioned to provide the means for a host of novel optical switching phenomena. It has been proposed as a means for strong coupling to two-dimensional materials, and has been extended to microwaves and acoustics. To date, however, CPA has been realized in silicon, plasmonic systems, and metamaterial devices only over narrow bandwidths (typically a single wavelength or a few nanometers) using two coherent laser beams having a fixed phase relationship. While proposals have been made to produce CPA at two distinct wavelengths or over a broad bandwidth, experimental observations have not been forthcoming.

In view of the state of, and the shortcomings of, the art, the inventors have recognized the benefits and advantages of the ability to controllably enhance the effective absorption of a specific material beyond its intrinsic absorption over a broad spectrum without modifying the material itself, using incoherent radiation, based solely on the judicious design of the photonic environment in which a layer of a lossy material is embedded. It would be particularly advantageous if complete absorption could be realized at all the resonances across an extended bandwidth range (one or more octaves) by all linear, lossy, planar photonic structures regardless of the details of their construction. The embodied apparatus, methods, and applications described in detail below and as recited in the appended claims enable the realization of such benefits and advantages.

SUMMARY of the EMBODIED INVENTION

The embodied invention is based on the discovery that the judicious design of the photonic environment in which a layer of a lossy material is embedded allows one to controllably sever the link between the effective optical absorption in a structure and the intrinsic absorption of the material from which it is constructed. Aspects and embodiments of the invention apply to all linear, lossy, planar photonic structures—regardless of the details of their construction. The specific, exemplary, non-limiting device architecture described herein below consists of a dielectric film placed between two lossless mirrors to form a symmetric or asymmetric resonator. A critical advantage of this configuration is that complete optical absorption is realized at all of the resonances over an octave of bandwidth using an incoherent optical beam. The bandwidth over which such control may be exercised is only limited by the ultimate fabrication precision and may extend for several octaves.

An aspect of the invention is an apparatus in the form of an optical resonator that includes two, multi-layer, aperiodic dielectric mirrors characterized by a reflectivity amplitude that increases in-step with increasing wavelength over an at least one octave bandwidth, and a lossy, dielectric, thin film characterized by an intrinsic optical absorption over the at least one octave bandwidth, disposed within the resonator, further wherein upon a single incoherent beam of optical radiation having a spectrum over the at least one octave bandwidth incident on one of the left side and the right side of the resonator, the lossy, dielectric thin film is characterized by an effective optical absorption at a resonant frequency over the at least one octave bandwidth that is greater than the intrinsic optical absorption at a resonant frequency over the at least one octave bandwidth. In various embodiments, the optical apparatus may have one or more of the following characteristics, limitations, and/or features:

wherein the resonator is an asymmetric resonator;

wherein upon a single incoherent beam of optical radiation having a spectrum over the at least one octave bandwidth incident on both the left side and the right side of the resonator structure, the lossy, dielectric thin film is characterized by an effective optical absorption at a resonant frequency over the at least one octave bandwidth that is greater than the intrinsic optical absorption at a resonant frequency over the at least one octave bandwidth.

An aspect of the invention is a method for complete optical absorption akin to coherent perfect absorption (CPA) using an incoherent optical radiation input. The method includes the steps of providing an optical resonator that includes two, multi-layer, aperiodic dielectric mirrors characterized by a reflectivity amplitude that increases in-step with increasing wavelength over an at least one octave bandwidth, and a lossy, dielectric, thin film characterized by an intrinsic optical absorption over the at least one octave bandwidth, disposed within the resonator, and inputting a single incoherent optical beam having a spectrum over the at least one octave bandwidth to one of a left side and a right side of the resonator structure, wherein the lossy, dielectric thin film is characterized by an effective optical absorption over the at least one octave bandwidth that is greater than the intrinsic optical absorption over the at least one octave bandwidth. In various embodiments, the method may have one or more of the following steps, characteristics, limitations, and/or features:

providing an asymmetric resonator structure;

inputting a single incoherent optical beam having a spectrum over the at least one octave bandwidth to both the left side and the right side of the resonator structure.

BRIEF DESCRIPTION OF THE FIGURES

FIG. 1A schematically illustrates left and right one-sided incidence on a generic 1D photonic structure (depicted as a slab), where $r_L$ and $r_L$ are the respective field reflection and transmission coefficients for left-side incidence, and $r_R$ and $t_R$ are the corresponding quantities for right-side incidence; FIG. 1B schematically illustrates two-sided incidence on a symmetric 1D structure; FIG. 1C schematically illustrates one-sided incidence on an asymmetric 1D structure; FIG. 1D schematically illustrates one-sided incidence on a symmetric 1D cavity consisting of a thin film of Si between two multilayer dielectric mirrors $M_1$ and $M_2$ (which has reverse layer-order); FIG. 1E schematically illustrates two-sided incidence on a symmetric 1D cavity consisting of a thin film of Si between the two multilayer dielectric mirrors $M_1$ and $M_2$. (The mirrors need not be periodic Bragg structures). FIG. 1F schematically illustrates one-sided incidence on an asymmetric 1D cavity consisting of a thin film of Si between mirrors $M_1^a$ and $M_2^a$; FIG. 1G graphically illustrates one-sided absorption, $A_1(\lambda)$ for the symmetric device in FIG. 1D with ideal mirrors ($A_1=\frac{1}{2}$ at all the resonances; $\omega$ is frequency, and $\theta_F$ is the frequency spacing of the cavity modes; FIG. 1H graphically illustrates two-sided absorption $A_2(\lambda)$ for the symmetric device in FIG. 1E with ideal mirrors; ($A_2=1$ at only half the resonances and $A_2=0$ at the other half. Here, the two incident fields are equal in amplitude and have a fixed phase relationship. FIG. 1I graphically illustrates one-sided absorption $A_1^a$ for the asymmetric device in FIG. 1F with ideal front mirror $M_1^a$ and unity-reflection back mirror $M_2^a$. Here, $A_1^a=1$ at all the resonances.

FIG. 2A graphically illustrates a theoretical model for mirror reflectivities $R_1$ and $R_2$ in a symmetric cavity for optimal one- and two-sided absorption $A_1$ (FIG. 1D) and $A_2$ (FIG. 1E), respectively, and $R_1^a$ for optimal one-sided absorption $A_1^a$ in an asymmetric cavity (FIG. 1F) all versus single-pass absorption A. $A=\frac{2}{3}$ is the limit for coherent enhancement of absorption for one-sided incidence in a symmetric cavity; FIG. 2B graphically illustrates measured single-pass absorption A in a 2 µm-thick layer of polycrystalline Si on a glass substrate (S) obtained by spectroscopic ellipsometry. The plot is rotated such that wavelength is the vertical axis to align the horizontal axes in (a) and (b), both corresponding to A; FIG. 2C graphically illustrates targeted $R_1(\lambda)$, $R_2(\lambda)$, and $R_1^a(\lambda)$ to optimize $A_1$, $A_2$, and $A_1^a$ in the Si layer in FIG. 2B, respectively. The mirror is on a glass substrate (S) and light is incident from Si. Insets in FIG. 2B and FIG. 2C show the corresponding configurations schematically. Three equally spaced wavelengths are selected in FIG. 2B from 800 nm to 1600 nm, and are shown as solid or hollow circles for $A_2$ and $A_1$ in the three panels, respectively. Dashed-dotted arrows are aids for the eye in conveying the transformation from measured absorption to target mirror reflectivity.

FIG. 3A schematically and graphically illustrates the calculated spectral reflectivity $R(\lambda)$ of the design mirror $M_1$ for the symmetric device on a glass substrate S (solid curve) compared to the target reflectivity (dashed curve) from FIG. 2C. Incidence is from the Si (see inset); FIG. 3B schematically and graphically illustrates the calculated (solid curve) and measured (dashed curve) reflectivity of the fabricated mirror $M_1$ on a glass substrate S for incidence from air (see inset); FIGS. 3C, 3D are the same as FIGS. 3A, 3B for the front mirror $M_1^a$ of the asymmetric device. The two curves in FIG. 3C coincide closely with each other; FIGS. 3E, 3F are the same as FIGS. 3A, 3B for the back reflector $M_2^a$ of the asymmetric device (note vertical scale for R).

FIG. 4A schematically illustrates the full device structure, where S=substrate; FIG. 4B shows photographs of 25 mm-diameter samples: mirror $M_1$ (2.2 µm-thick), thin Si film (2 µm-thick), and the device $M_1$+Si+$M_2$ (6.4 µm-thick), all on BK7 substrates; FIG. 4C schematically illustrates the optical measurement setup; FIGS. 4(D-F) graphically show theoretical predictions of $R_L$, $T_L$, and $A_1$ for the full S+$M_1$+Si+$M_2$+S structure obtained using transfer-matrix calculations; and FIGS. 4(G-I) graphically show the corresponding measured spectral dependence. The dotted horizontal lines correspond to the ideal theoretical limits for optical coherent absorption in a symmetric structure for a one-sided-incidence configuration.

FIG. 5A schematically illustrates the full device sample structure, where S=substrate; FIGS. 5(B-D) graphically show theoretical predictions of $R_L$, $T_L$, and $A_1^a$ for the full $M_1^a$+Si+$M_1^a$ structure obtained using transfer-matrix calculations; and FIGS. 5(E-G) graphically show the corresponding measured spectral dependence. The dotted lines in FIG. 5D and FIG. 5G correspond to the single-pass absorption A of a 2 µm-thick Si film from FIG. 2B.

FIGS. 7(A-B) graphically shows layer thicknesses for the mirrors used in the asymmetric cavity.

DETAILED DESCRIPTION OF NON-LIMITING, EXEMPLARY EMBODIMENTS OF THE INVENTION

Figure 1:
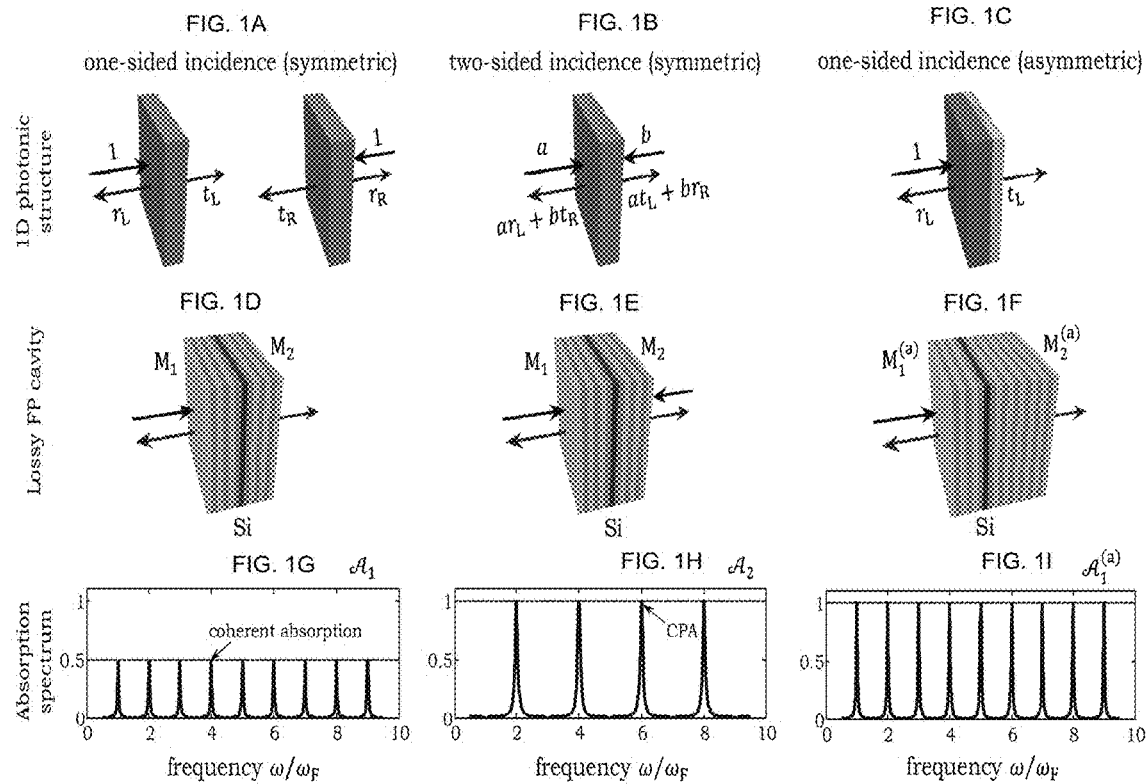
FIGS. 1(A-I) illustrate coherent absorption for one- and two-sided incidence on a 1D photonic structure.

The underlying discovery of our invention is that by sculpting a material's photonic environment, we could sever the link between the effective absorption of a structure and its intrinsic material absorption. The bandwidth over which such control may be exercised is only limited by the ultimate fabrication precision, and may extend for several octaves. We have thus created the basis for a transformative method that helps address a host of critical photonic challenges, including but not limited to cost-effective harnessing of infrared solar energy, achieving flat spectral sensitivity for photodetectors, and maximizing pump absorption in lasers using only planar technology. The disclosed device design strategy may be readily extended to on-chip implementations other than planar structures, which may, e.g., relax the materials constraints for efficient on-chip optical detection, strong-coupling with resonant materials, and ultra-sensitive detection of pathogens.

A milestone in the development of ultrabroad-bandwidth lasers was the realization that chirped mirrors with spectrally flat reflection amplitude enable control over the cavity dispersion via their spectral phase, which is necessary to produce ultrashort pulses. We demonstrate that in lossy cavities, the bandwidth of the CPA effect is increased through control over the spectral amplitude of the mirror reflectivities, not the phase. By implementing this principle, we have demonstrated coherent perfect absorption over a full octave of bandwidth (~800-1600 nm) that is dramatically broader than previous experimental results.

Although the disclosure herein below describes enhanced optical absorption in Si, the embodied approach is applicable to any other material that may be processed into a film. Resonant absorption in organic dyes, for example, may also be exploited through the use of mirrors with a 'dip' in reflectivity corresponding to the resonant 'peak' in absorption, as dictated by the design principle in FIG. 2A. Nevertheless, there are practical limits for the extent to which this approach may be applied. Specifically, layers with very small intrinsic absorption A will require very high R and are less tolerant to perturbations resulting from finite fabrication tolerances. The challenge remains to extend the CPA effect to continuously cover the spectrum, essentially 'filling in' the gaps between the resonances by, e.g., exploiting the concept of white light cavities or optimizing the mirror structure with respect to both the reflectivity amplitude and phase.

In contrast to previous studies in which two coherently interfering beams were necessary, the embodied invention is enabled by the use of a single-beam configuration in symmetric structures to obtain the same total absorption as in two-beam-CPA, or twice that of two-beam-CPA in optimized asymmetric structures. This approach thus facilitates utilizing incoherent rather than coherent light, thereby expanding the scope of potential applications. The embodied methodology for coherently enhancing absorption is amenable to a wide range of materials other than Si and uses only planar technology, readily allowing implementation on large surface areas and flexible substrates.

According to an exemplary embodiment, a thin polycrystalline Si film is embedded (disposed) in a Fabry-Pérot (FP) resonator comprising few nm-thick, aperiodic, multilayer dielectric mirrors. This structure demonstrated spectrally flat, coherent perfect absorption in a 2 nm-thick Si film across an octave of bandwidth in the NIR, from ~800-1600 nm. A central insight for increasing the CPA bandwidth is provided by a theoretical model: the decline in Si absorption at longer wavelengths necessitates the use of cavity mirrors whose reflectivity amplitude increases in-step with wavelength.

Coherent Perfect Absorption

We first highlight a fundamental feature of planar one-dimensional (1D) linear photonic structures. The one-sided-incidence configurations in FIG. 1A result in fractions $A_1{}^L$ and $A_1{}^R$ of left- and right-incident light absorbed, respectively, which we term 'one-sided absorption.' In the two-sided-incidence configuration in FIG. 1B, we define a 'two-sided absorption' $A_2$. Interference in this linear system may increase $A_2$ above $A_1{}^L$ and $A_1{}^R$ to 100%, or decrease it to 0%. This can be made clear in the case of a symmetric system, where the left and right ports are interchangeable $A_1{}^L = A_1{}^R = A_2$ and $A_2 = A_1 - 4\text{Re}[t_L^* r_L]|a||b|\cos\phi$. Here, $\phi$ is the relative phase between the incident field amplitudes a and b, $|a|^2 + |b|^2 = 1$, and $r_L$ and $t_L$ are the field reflection and transmission coefficients, respectively. While the interference term $\text{Re}[t_L^* r_L]$ is zero in any 'lossless symmetric' 1D structure, it may become non-zero in non-Hermitian structures. That is, while the reflected and transmitted fields from a lossless 1D structure are in quadrature and thus cannot interfere, introducing 'loss' enables such interference. Increasing $A_2$ by maximizing this absorption-mediated interference effect requires incident fields with equal amplitudes $|a| = |b|$ and relative phase $\phi = 0$ or $\pi$. Furthermore, the structure itself must be characterized by reflection and transmission coefficients having equal amplitudes $|r_L| = |t_L|$ and a relative phase $\phi = 0$ or $\pi$. If these conditions are satisfied at a given wavelength, then CPA, where $A_2 = 1$, is achieved when $\cos\phi\cos\theta = -1$. This phenomenon has its origin in the emergence of a 'dark state' in such symmetric systems: a zero eigenvalue of the associated scattering matrix whose corresponding eigenvector dictates the relative amplitude and phase of the incident fields that may undergo CPA.

In addition to the above-described symmetric configuration, asymmetric arrangements, as illustrated in FIG. 1C, provided with a back-reflector that prevents the passage of light ($t_L = 0$) are particularly useful for demonstrating CPA with a single incident beam. In this case, only one-sided incidence is relevant and $A_1{}^a = 1 - |r_L|^2$, which may reach 100% if $r_L = 0$. (Note, the superscript hereinafter will refer to quantities related to asymmetric structures).

Lossy Fabry-Pérot-Resonator Model

The discussion above applies to all linear, lossy, planar photonic structures regardless of the details of their construction. The exemplary device architecture discussed herein is a Si film placed between two lossless mirrors ($M_1$ and $M_2$) to form a symmetric or asymmetric Fabry-Pérot resonator as illustrated in FIGS. 1D-F). In the former, $M_1$ is chosen to have the same layers as $M_2$ in reverse order (FIGS.

1D, E), while in the latter a back-reflector $M_2^a$ replaces $M_2$, and a new 'front' mirror $M_1^a$ is required (FIG. 1F). We wish to design both of these photonic structures (symmetric and asymmetric) to achieve CPA in the Si layer over an extended bandwidth.

If the complex refractive index of Si is $n_{Si}=n+in'$, where the positive sign of the imaginary part n' corresponds to absorption, then the fraction of light absorbed after a single pass in a layer of thickness d is $A=1-e^{-2k'd}$, $0 \leq A \leq 1$, where $k'=2\pi n'/\lambda$ and $\lambda$ is the free-space wavelength. Intuitively, one anticipates that sandwiching the Si film between two mirrors with high reflectivity increases absorption on resonance because light is recycled in the cavity. Surprisingly, this is not the case. Instead, for a given value of single-pass absorption A, there are optimal values of mirror reflectivities that maximize $A_1$, $A_2$, or $A_1^a$ by striking a balance between interference and absorption.

For one-sided incidence in a symmetric structure, taking $R=R_1=(2-3A)/(1-A)(2+A)$ optimizes $A_1$ and results in $A_1=0.5 \cos h^2 k'd \geq 0.5$, where R is the reflectivity from Si (FIG. 2A); that is, a minimum of 50% absorption is achieved on resonance no matter how low the intrinsic absorption A is (FIG. 1G). Here, R corresponds to the reflectivity of the mirror when incident from a Si substrate. These equations for $R_1$ and $A_1$ hold in the range $0<A \leq \frac{2}{3}$, at the end of which $A_1=A=\frac{2}{3}$. For a lossy layer with $A>\frac{2}{3}$, no 'symmetric' cavity can improve one-sided absorption $A_1$ beyond the single-pass absorption A in the bare material. Asymmetric structures, however, can exceed this limit as shown below. On the other hand, for two-sided incidence, if one employs symmetric mirrors with $R=R_2=1-A$ (FIG. 2A), then two-sided absorption is optimized ($A_2=1$; FIG. 1H) when, in addition, the amplitudes and relative phase of the two incident fields are adjusted as described above. Two features are clear in the plots of $R_1$ and $R_2$ versus A in FIG. 2A: (1) high (low) intrinsic absorption necessitates the use of $M_1$ and $M_2$ with low (high) R; and (2) for low A, $R_1 \approx R_2$: the same mirrors are optimal for both one- and two-sided absorption in low-loss materials placed in a symmetric structure.

As demonstrated above, $A_1 \geq \frac{1}{2}$ occurs for 'all' the resonances when $R=R_1$ (FIG. 1F). When $R=R_2$, however, $A_2=1$ at only 'half' the resonances (FIG. 1H) since $A_2=1-(\frac{1}{2})[1-(-1)^m \cos \phi]\mathrm{sech}^2 k'd$, where m is the resonance order and $\phi$ is the relative phase between two incident fields of equal amplitudes. When $\phi=0$ ($\phi=\pi$), even-ordered (odd-ordered) resonances undergo complete absorption. This limitation is not important when a single resonance is targeted, since we can always achieve $A_2=1$ and $A_1 \geq \frac{1}{2}$ at a single wavelength simultaneously. However, when a 'broad bandwidth' is of interest, this result indicates, surprisingly, that one-sided incidence in an optimized symmetric structure yields a larger 'total' absorption than two-sided incidence, with no need to arrange for the interference of two beams. This feature is particularly critical because it offers experimental simplification and also facilitates the use of incoherent light.

Figure 2:
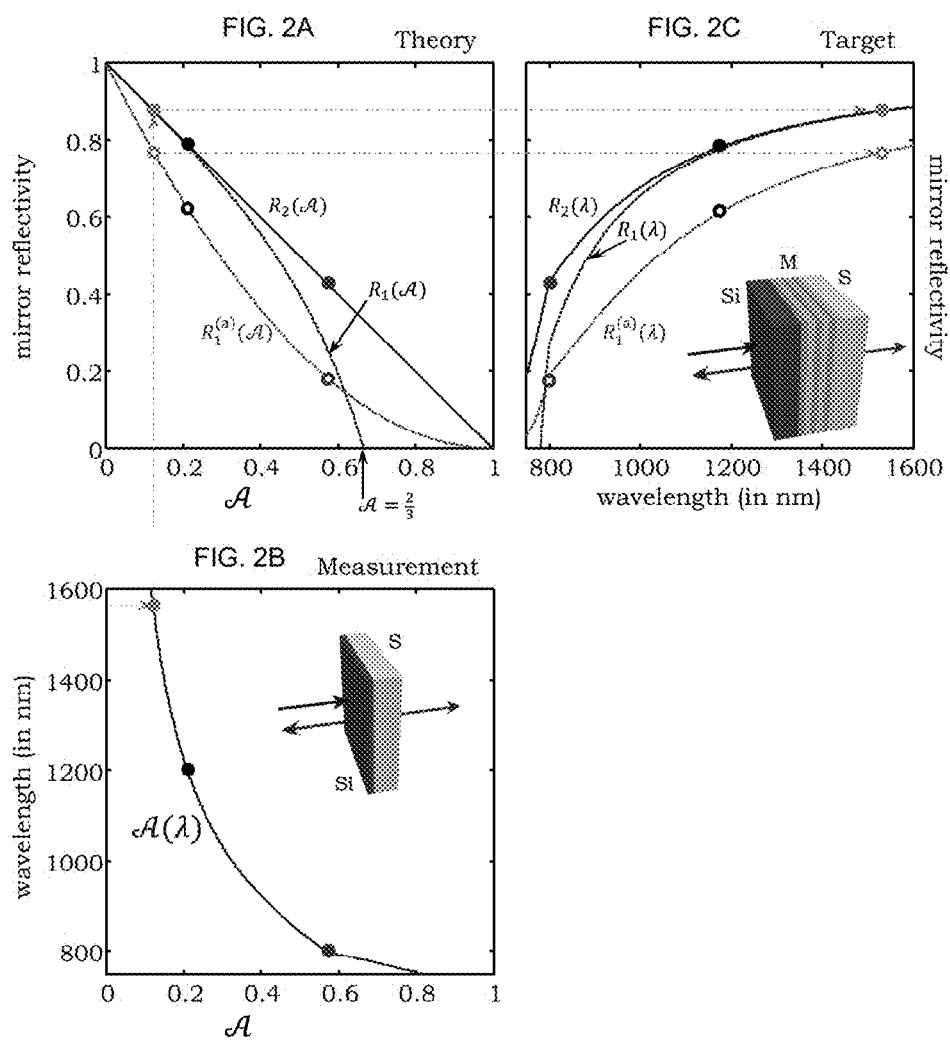
FIGS. 2(A-C) illustrate ideal mirror reflectivity to optimize one- and two-sided coherent absorption.

In an asymmetric structure with mirrors $M_1^a$ and $M_2^a$, if the reflectivity of $M_2^a$ is unity, then it can be shown that choosing the reflectivity of $M_1^a$ to be $R_1^a=(1-A)^2$ indeed eliminates reflection altogether and results in perfect one-sided absorption $A_1^a=1$. Comparing $R_1^a$ with $R_2$ in FIG. 2A shows that $R_1^a \leq R_2$, which is typically easier to achieve from the perspective of fabrication. A critical advantage of this configuration is that complete absorption is realized at 'all' the resonances (FIG. 1I), such that twice the total absorption is produced here for one-sided incidence compared to that realized in a symmetric structure in the CPA condition for two-sided incidence. All three curves in FIG. 2A are completely general and apply to 'any' material, thin-film thickness, or wavelength.

Wavelength-Dependence of Absorption

We have established that the reflectivity of $M_1$ or $M_1^a$ required for maximum absorption is predicated on the intrinsic absorption A; the resulting absorption, however, is independent of A. All real materials have wavelength-dependent A as dictated by the Kramers-Kronig relations. Achieving $A_2=1$ and $A_1 \geq \frac{1}{2}$ in a symmetric structure, or $A_1^a=1$ in an asymmetric structure, over a large-enough bandwidth, whereupon A varies substantially, therefore necessitates the use of mirrors whose spectral reflectivity also changes with wavelength, to counterbalance the spectral variation in A. Consequently, Bragg or other mirrors with flat spectral reflectivity will be optimal only in a limited wavelength span. The measured $A(\lambda)$ for a 2 μm-thick layer of polycrystalline Si is shown in FIG. 2B. By combining this 'measured' $A(\lambda)$ with the 'theoretical' optimal reflectivity $R_{1,2}(A)$ and $R_1^a(A)$ (FIG. 2A), we obtain the 'target' spectral reflectivity $R_{1,2}(\lambda)$ that maximizes $A_1$ or $A_2$ and $R_1^a(A)$ that maximizes $A_1^a$ (FIG. 2C). The decline in the absorption of Si in the NIR requires that R increase with $\lambda$ in all cases.

Inverse Mirror Design

Figure 3:
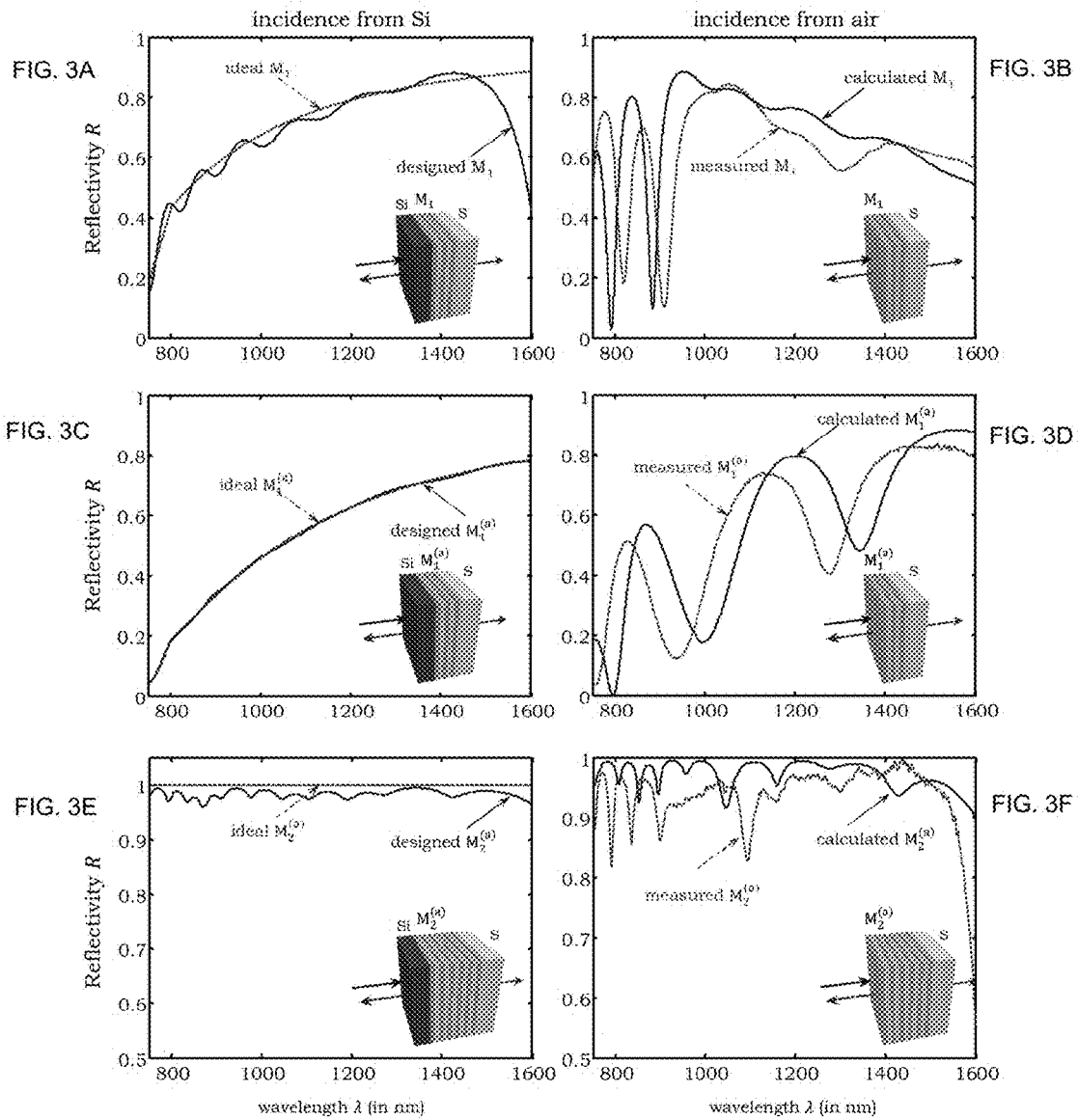
FIGS. 3(A-F) illustrate mirror design for optimized CPA.
Figure 6:
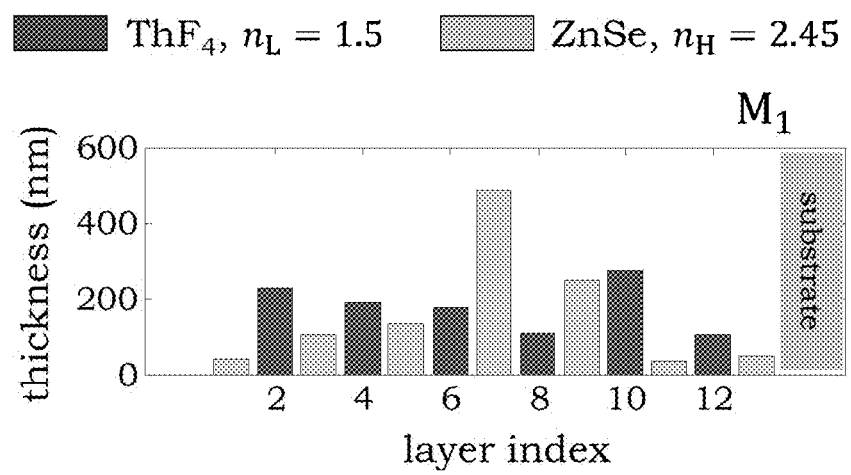
FIG. 6 graphically shows layer thicknesses for the mirrors used in the symmetric cavity and, particularly, film thicknesses for the 13-layer mirror $M_2$ (FIGS. 3A, 3B) used in constructing the symmetric device. Mirror $M_2$ has the same layers in reverse order. The two materials in all the mirrors are ZnSe and $ThF_4$.

We carried out the inverse design of the target mirror in a symmetric device $R_2(\lambda)=1-A(\lambda)$ (FIG. 2C) to optimize two-sided absorption, and simultaneously one-sided absorption for low A (FIG. 2A), using the FilmStar software package (FTG Software Associates). This software employs damped least-squares optimization to inversely synthesize the structure through computing the derivatives (differential change in layer thickness) at each target reflectivity point over the spectrum and iterative matrix inversion. Using lossless materials with indices $n_L=1.5$ and $n_H=2.45$, we optimized the structure design iteratively while reducing the number of layers N, to simplify fabrication and reduce the structure thickness. Employing N=13 layers for the mirrors $M_1$ and $M_2$ in a symmetric structure (the sequence of thicknesses is given in FIG. 6, the resulting mirror has a reflectivity that approaches the target over an octave of bandwidth in the NIR, (~800-1600 nm) (FIG. 3A). The thickness of this mirror is ≈2.2 μm, resulting in a total device thickness of ≈2×2.2+2=6.4 μm. In contrast to the Bragg condition, where the ratio of the layer thicknesses is in inverse proportion to the ratio of their refractive indices, some of the high-refractive-index layers in the embodied mirror design are in fact thicker than some of their low-refractive-index counterparts. Allowing for more layers N, and consequently a thicker device, enables more accurate approximation to the desired target spectral reflectivity $R(\lambda)$.

Figure 7A:
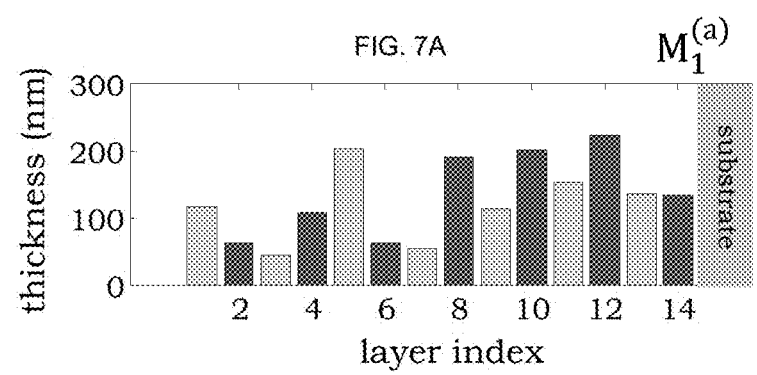
FIG. 7A Layer thicknesses for the 14-layer front mirror $M_1{}^a$ (FIGS. 3C-D) used in the asymmetric device.
Figure 7B:
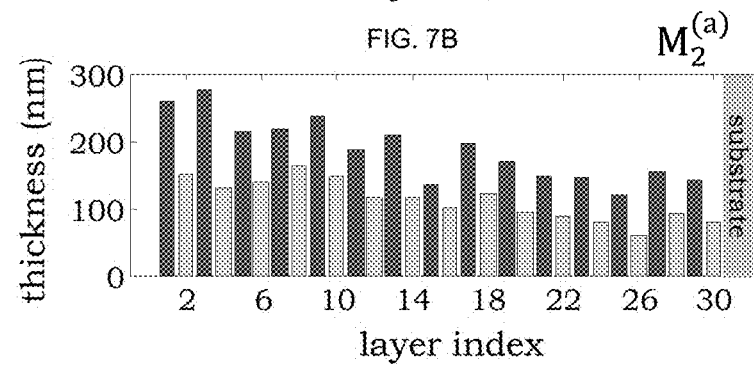
FIG. 7B Layer thicknesses for the 30-layer back-reflector $2_1{}^a$ (FIGS. 3E-F) used in the asymmetric device. The two materials in all the mirrors are ZnSe and $ThF_4$.

For asymmetric configurations, we design a mirror $M_1^a$ having reflectivity $R_1(\lambda)=[1-A(\lambda)]^2$ (FIG. 3C) and a back reflector $M_2^a$ having flat unity-reflectivity over the bandwidth octave of interest (FIG. 3E). In this design, $M_1^a$ ($M_2^a$) consists of 14 (30) alternating layers of materials with indices $n_L=1.5$ and $n_H=2.45$, and total thickness of 1.8 μm (4.5 μm). The total asymmetric device thickness is 8.3 μm. The sequences of layer thicknesses for both mirrors are given in FIG. 7. Note that in both the symmetric and asymmetric devices, the thicknesses of the mirrors are on the order of the thickness of the Si layer itself, and they may be further reduced using higher-index-contrast materials.

Device Fabrication

The full symmetric device structure ($M_1$+Si film+$M_2$) was fabricated sequentially using physical vapor deposition employing as high- and low-refractive-index dielectrics ZnSe ($n_H$=2.45) and ThF$_4$ ($n_L$=1.5), respectively. First, alternating ZnSe and ThF$_4$ layers are deposited from resistive targets on BK7 substrates (refractive index $n_s$=1.52) to form M$_2$; a 2 μm thick polycrystalline Si layer is added via e-beam evaporation; and, finally, M$_2$ is deposited with the reverse layer-order of M$_1$. With the addition of a 1 mm thick borosilicate glass slide after M$_2$, we obtain a symmetric structure. This fabrication sequence allowed us to isolate the individual components that constitute the structure, the mirrors M$_1$ and M$_2$, and the Si layer, for characterization. The measured spectral reflection from M$_2$ (on a BK7 substrate) compared to a transfer-matrix calculation is shown in FIG. 3B. Note that incidence is from air in FIG. 3B, and not from Si as in FIG. 3A, which dramatically changes the spectral reflection from this mirror.

A similar approach was followed to fabricate and characterize the asymmetric device (M$_1^a$+Si film+M$_2^a$). Mirror M$_1^a$ was designed assuming incidence from air, and no extra glass slide is required here. Measurements for M$_1^a$ and M$_2^a$ corresponding to those of M$_1$ in FIG. 3B are presented in FIG. 3D and FIG. 3F, respectively.

Optical Device Characterization

Figure 4:
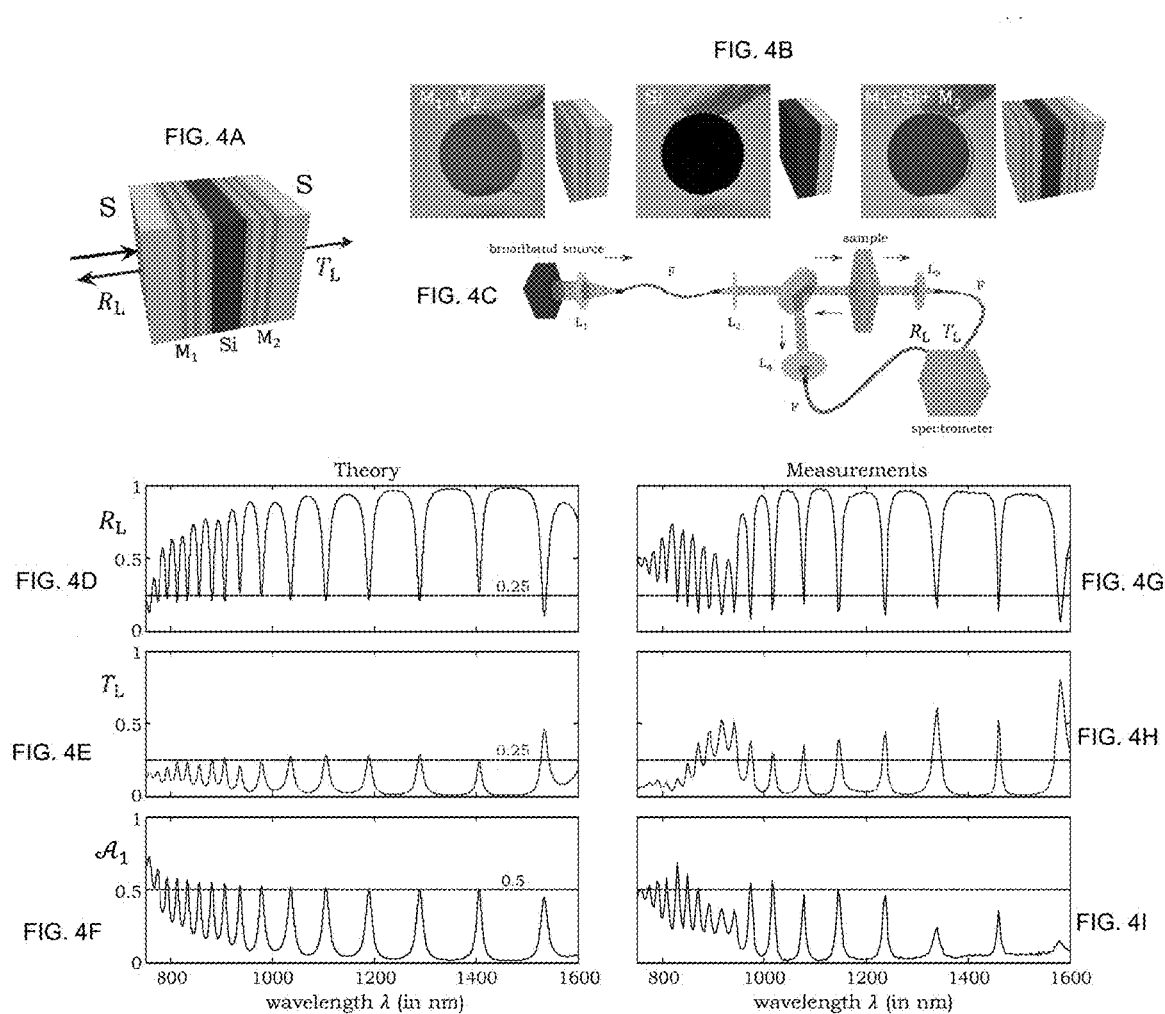
FIGS. 4(A-I) illustrate measurements and theory for coherent one-sided absorption in a symmetric cavity.

We now proceed to the optical characterization of the complete symmetric device (FIGS. 4A, B) in the one-sided-incidence configuration, carried out using the optical setup shown schematically in FIG. 4C for normally incident light. Making use of a collimated incoherent beam from a Tungsten lamp, we measure the transmission coefficient $T_L$, normalized with respect to the incident beam, and the reflection coefficient $R_L$, normalized with respect to that of a silver mirror, from which we determine the one-sided absorption $A_1$=1−$R_L$−$T_L$. These measurements are in contradistinction to all reported CPA measurements, which have been performed with coherent light.

We plot the measured values of $R_L$, $T_L$, and $A_1$ as a function of wavelength in FIGS. 4G-I compared to the corresponding calculated quantities given in FIGS. 4D-F obtained using the transfer-matrix method. The spectral phase of reflection from M$_1$, $\alpha(\lambda)$, and the refractive index of Si, $n_{Si}(\lambda)$, determine the locations of the resonances through $\alpha(\lambda)+(2\pi/\lambda)n_{Si}(\lambda)d=m\pi$ (the resonance order m is an integer. The strength of the resonances is set by the fidelity of the achieved R (for M$_2$) to the target design (FIG. 2C). In our calculations, we made use of the measured $n_{Si}(\lambda)$. In comparing the measurements and theoretical predictions of $R_L$, $T_L$, and $A_1$ for the symmetric device, we note that the greatest deviation is in the vicinity of $\lambda$=1300 nm, where the reflectivity of M$_1$ departs from the target values (FIG. 3C). A similar deviation occurs at the short wavelength edge (~800 nm). In general, reaching the theoretical value of $A_1$=0.5 at any resonance is readily predicted by the proximity of R to the target.

Figure 5:
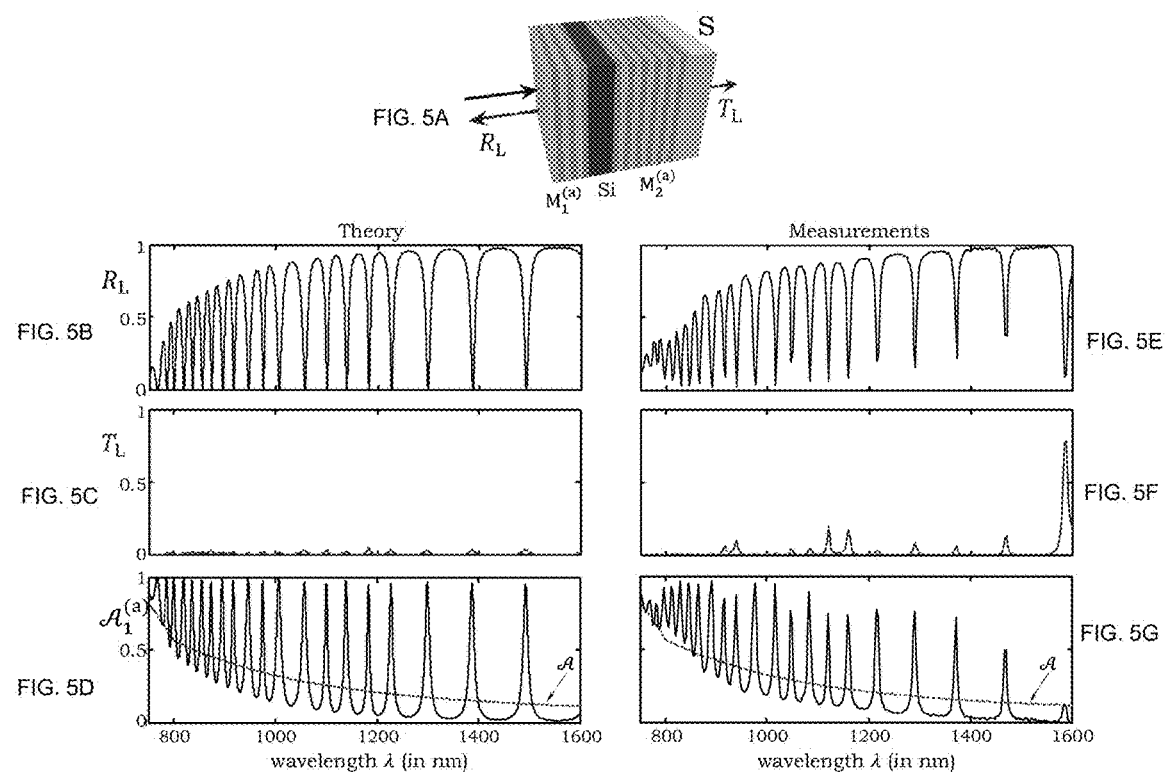
FIGS. 5(A-G) illustrate measurements and theory for one-sided coherent perfect absorption in an asymmetric cavity.

We have carried out one-sided-incidence measurements on the asymmetric device and compared the measured and theoretically predicted values of $R_L$, $T_L$, and $A_1^a$ over a full spectral octave in FIG. 5. In contrast to $A_1$ in FIG. 4, $A_1^a$ is substantially larger than the symmetric-device-limit of $A_1 \geq \frac{1}{2}$. We also superimpose the measured single-pass absorption A of Si (FIG. 2B) on the measured and predicted $A_1^a$. We note again that deviations from achieving the theoretical limit of $A_1^a$=1 are associated with inaccuracies in mirror fabrication, which manifest themselves in differences between the target and measured reflectivities. Our measurements in FIG. 3 and statistical calculations indicate that there is ~5% error in the layer thicknesses of the fabricated mirrors. Reducing this error to ~2%, which may be readily achieved by the optical thin-film industry, makes the resulting deviations in mirror reflectivity have negligible impact on the effective absorption.

Methods

Requirements for Achieving CPA in Planar Symmetric 1D Photonic Structures

Consider a 1D photonic structure described by a scattering matrix $$S = \begin{pmatrix} t_L & r_R \\ r_L & t_R \end{pmatrix},$$

which relates the incoming amplitudes $$\begin{pmatrix} a_L \\ b_R \end{pmatrix}$$

and outgoing amplitudes $$\begin{pmatrix} b_L \\ a_R \end{pmatrix}.$$

We use the following definitions for the complex elements of S: $|t_L|=|e^{i\beta_L}|$, $t_R=|t_R|e^{2\beta_R}$; $r_L=|r_L|e^{i\alpha_L}$, $r_R=|r_R|e^{i\alpha_R}$; and define their squared amplitudes as $T_L=|t_L|^2$, $R_L=|r_L|^2$, and $R_R=|r^R|^2$. Conservation of energy in such a system dictates that $T_L+R_L=1$, $T_R+R_R=1$, $T_L-T_R=|t|^2$, and Re$\{(t_L^* r_R+r_L^* t_R)e_{i\phi}\}$=0, for an arbitrary phase $\phi$. The latter constraint is equivalent to $\theta_L|\theta_R=\pi$, where $\theta_L=\beta_L \alpha_L$ and $\theta_R=\beta_R\alpha_R$. In a symmetric lossless system, $t_L$-$t_R$ and $r_L$-$r_R$, resulting in $\theta_L=\theta_R=\theta=\pm a/2$, such that Re$\{t_L^* r_L\}$=0. The eigenvalues and eigenvectors of S are $\lambda_\pm = e^{i(\beta \pm \gamma)}$ and $$|\Psi_\pm\rangle = \frac{1}{\sqrt{2}}\begin{pmatrix} 1 \\ \pm 1 \end{pmatrix},$$

respectively, and cos γ−|t|.

In the presence of loss, we define the one-sided absorption coefficient as $\mathcal{A}_1^{(L)}=1\,T_L R_L$ for left incidence and $\mathcal{A}_1^{(R)}=1\,T_R R_R$ for right incidence. The two-sided absorption coefficient is $\mathcal{A}_2=1-T_1-T_2$, where $T_1=|t_1|^2$, $T_2=|t_2|^2$, $t_1=r_L a_L + t_R b_R$, and $t_2=t_L a_L+r_R b_R$. Therefore, in general, $\mathcal{A}_2=\mathcal{A}_1^{(L)}|a_L|^2|\mathcal{A}_1^{(R)}|b_R|^2$ 2Re$\{(t_L^* r_R|r_L^* t_R)a_L^* b_R\}$, where we have normalized the inputs such that $|a_L|^2+|b_R|^2$=1. In a symmetric structure, $\mathcal{A}_1^{(L)}=\mathcal{A}_1^{(R)}=\mathcal{A}_1$ and $\mathcal{A}_2=\mathcal{A}_1-4$Re$\{t_L^* r_L\}$Re$\{a_L^* b_R\}=\mathcal{A}_1-4\sqrt{T_L R_L}|a_L||b_R|$ cos θ cos φ). Two-sided absorption in such a system reaches a maximum of $\mathcal{A}_2=\mathcal{A}_1+2\overline{T_L R_L}=1-(\sqrt{T_L}-\sqrt{R_L})^2$ when $$|a_L| = |b_R| = \frac{1}{\sqrt{2}}$$

and cos θ cos φ−−1. Thus, in structures where $T_L=R_L$, CPA is achieved ($\mathcal{A}_2$=1). The eigenvalues of such a system are given by $\lambda_1-e^{i\beta}(|t|\perp|r|)$, with the same eigenvectors $$|\Psi_\pm\rangle = \frac{1}{\sqrt{2}}\begin{pmatrix}1\\\pm 1\end{pmatrix}$$

of a lossless symmetric system. When $|t|=|r|$, $\lambda_+=2e^{i\beta}|t|$ while $\lambda_-=0$, the latter of which leads to a 'dark state' responsible for the CPA effect. When $|t|=\frac{1}{2}$, the 'bright state' is characterized by $|\lambda_+|=1$, otherwise $|\lambda_+|<1$ and there is remnant absorption.

CPA in a Lossy Fabry-Pérot Resonator

Consider the FP resonator shown in FIG. 1D. The scattering matrix for the mirror $M_1$ is $$S_{M_1} = \begin{pmatrix} te^{i\beta} & -re^{i(2\beta-\alpha)} \\ re^{i\alpha} & te^{i\beta} \end{pmatrix},$$

where we assume that the mirror is lossless $r^2+t^2=1$ (r and t here are real), but not necessarily symmetric, $\alpha$ and $\beta$ are the reflection and transmission phases, respectively, and r is the reflection coefficient for incidence from the defect layer material (Si here). The scattering matrix for $M_2$, whose structure is axially reversed with respect to $M_1$, is $$S_{M_2} = \begin{pmatrix} te^{i\beta} & re^{i\alpha} \\ -re^{i(2\beta-\alpha)} & te^{i\beta} \end{pmatrix}.$$

Using the transfer matrix method, we obtain the field reflection and transmission coefficients $$(R = r^2),\ t_L = (1-R)e^{i(2\beta-\alpha)}\frac{e^{i(kd+\alpha)}}{e^{k'd}-Re^{-k'd}e^{i(2kd+2\alpha)}},$$

$$r_L = -\sqrt{R}\,e^{i(2\beta-\alpha)}\frac{e^{k'd}-e^{-k'd}e^{i(2kd+2\alpha)}}{e^{k'd}-Re^{-k'd}e^{i(2kd+2\alpha)}}.$$

On resonance $2kd+2\alpha=2m\pi$, where $m=1, 2, 3, \ldots$, and the power reflection and transmission coefficients are $$T_L = \left(\frac{1-R}{e^{k'd}-Re^{-k'd}}\right)^2 \text{ and } R_L = R\left(\frac{2\sinh k'd}{e^{k'd}-Re^{-k'd}}\right)^2,$$

respectively. The one-sided absorption coefficient on resonance is thus $$\mathcal{A}_1 = \mathcal{A}(1-R)\frac{1+R(1-\mathcal{A})}{(1-R(1-\mathcal{A}))^2}.$$

To find the mirror reflectivity that optimizes $\mathcal{A}_1$, we set $$\frac{d\mathcal{A}_1}{dR} = 0$$

and solve for $$R = R_1 = \frac{3-e^{2k'd}}{3-e^{-2k'd}} = \frac{2-3\mathcal{A}}{(1-\mathcal{A})(2+\mathcal{A})}.$$

The optimal one-sided absorption is thus $$\mathcal{A}_1 = \frac{1}{2}\cosh^2 k'd.$$

Similarly, the two-sided absorption coefficient on resonance when $$|a| = |b| = \frac{1}{\sqrt{2}}$$

is given by $$\mathcal{A}_2 = \mathcal{A}_1 + 2(-1)^m\cos\varphi\,\frac{\mathcal{A}(1-R)\sqrt{R(1-\mathcal{A})}}{\{1-R(1-\mathcal{A})\}^2}.$$

If we set $\phi=0$ or $\pi$, then $(-1)^m \cos\phi=\pm 1$, and $\mathcal{A}_2$ becomes $$\mathcal{A}_2 = \mathcal{A}(1-R)\left\{\frac{1\pm\sqrt{R(1-\mathcal{A})}}{1-R(1-\mathcal{A})}\right\}^2.$$

To optimize $\mathcal{A}_2$, we set $$\frac{d\mathcal{A}_2}{dR} = 0$$

and solve for $R=R_2=e^{-2k'd}=1-\mathcal{A}$, upon which $$\mathcal{A}_2 = \frac{1\pm(1-\mathcal{A})}{2-\mathcal{A}}.$$

The plus sign (corresponding to only half of the resonances, of either even or odd order) results in the 'dark state' $\mathcal{A}_2=1$ and CPA is achieved. The negative sign (corresponding to the other half of the resonances) results in $$\mathcal{A}_2 = \frac{\mathcal{A}}{2-\mathcal{A}} = \tanh k'd,$$

which is the remnant absorption in the 'bright state.' When $R=R_2$, one-sided absorption is sub-optimal at $$\mathcal{A}_1 = 1 - \frac{1}{2}\mathrm{sech}^2 k'd.$$

Impact of Substrate Change on Mirror Reflectivity

While the design methodology for obtaining $\mathcal{A}_1$ and $\mathcal{A}_2$ presupposes that incidence on mirror $M_1$ takes place from the cavity defect layer (Si here), in measurements, typically incidence is from air. To convert the mirror reflectivity $R^{Si}$ in the former to that of the latter $R^{air}$, it is more convenient to use transfer matrices than scattering matrices. If the transfer matrix for incidence from Si is $M^{Si}$ and from air is $M^{air}$, it may be shown that they are connected through $$M^{air} = \frac{1}{2}\begin{pmatrix} 1+n & 1-n \\ 1-n & 1+n \end{pmatrix} M^{Si},$$

where n is the refractive index of Si, and the elements of the transfer matrix M are related to those of the scattering matrix S through $$M = \frac{1}{t_L}\begin{pmatrix} 1 & -r_R \\ r_L & t_L t_R - r_L r_R \end{pmatrix}.$$

As such, the reflection and transmission coefficients after changing the incident material are related through $$r_L^{air} = \frac{r^{air,Si} + r_L^{Si}}{1 + r^{air,Si} r_L^{Si}},$$

$$t_L^{air} = \frac{t^{air,Si} + t_L^{Si}}{1 + r^{air,Si} r_L^{Si}},$$

where $$r^{air,Si} = \frac{1-n}{1+n} \text{ and } t^{air,Si} = \frac{2}{1+n}.$$

Using these relationships, one may predict the mirror reflectivity as measured for incidence from air shown in FIG. 3C from the theoretical model of mirror reflectivity for incidence from Si shown in FIG. 3B.

Asymmetric FP Resonators

The analysis presented above can be readily extended to the case where the two mirrors $M_1$ and $M_2$ are no longer symmetric. The case of most interest is when $M_1^{(a)}$ is a perfect reflector. In the presence of this back-reflector, two-sided incidence is no longer relevant and the one-sided absorption coefficient is given by $$\mathcal{A}_1^{(a)} = \mathcal{A}(1-R)\frac{(2-\mathcal{A})}{\{1-\sqrt{R}(1-\mathcal{A})\}^2},$$

which reaches a maximum value of $\mathcal{A}_1^{(a)} = 1$ when the reflectivity of $M_1^{(a)}$ is $R = R_2^{(a)} - (1-\mathcal{A})^2$.

Thin Film Deposition Process for Device Fabrication

The coatings for the ZnSe/ThF$_4$ multi-layer mirrors and the Si dielectric sandwiched between them were fabricated at Quality Thin Films (QTF, Oldsmar, Fla., USA). The coatings were deposited using a combination of two vacuum chambers, both pumped to the desired environment using cryogenic pumps, typically a vacuum environment achieving a base nominal pressure of $5 \times 10^{-6}$ torr. Coating processes were of the physical vapor deposition (PVD) type, using a combination of technologies: e-beam for Si (VPT Technologies, VPT#3000GPOC, 30-inch square vacuum chamber) and resistive sources for ZnSe/ThF4 (DW Industries, DW-3#21750, 32-inch diameter steel-bell-jar vacuum chamber). Substrates were prepared in a class-1000 clean room under class 100 HEPA filter flow.

Starting from a BK7 substrate (25 mm-diameter, 3.2 mm-thick), the sequence of layers shown in FIG. 3A is evaporated to produce mirror $M_1$. Some samples are removed from the chamber at this stage (and used to obtain the spectral reflectivity $R(\lambda)$ shown in FIG. 3C) and replaced with fresh substrates. The Si layer is evaporated, resulting in S+$M_2$+Si and S+Si layers, the latter of which are used to obtain the spectral single-pass absorption curve $\mathcal{A}(\lambda)$ in FIG. 2C. Some samples are removed from the chamber at this stage. Finally, the reversed sequence of layers shown in FIG. 3A was evaporated to produce mirror $M_2$, resulting in S+$M_1$+Si+$M_2$, and S+$M_2$ structures. To render the full structure symmetric, a borosilicate microscope slide (1 mm thick) is placed on the final structure S+$M_1$+Si+$M_2$+S. The fabrication of the asymmetric device follows the same steps, except for the different layer thicknesses of mirrors $M_1^{(a)}$ and $M_2^{(a)}$.

One-Sided Absorption Measurements

Light from a Tungsten lamp (Thorlabs QTH10; 50 mW) is coupled into a multimode fiber (50 μm diameter core) using an achromatic doublet lens $L_1$ with focal length l=4 cm. Light exiting the fiber is collimated via a f=8 mm aspheric lens $L_2$ to a 2 mm diameter beam incident normally on the samples after traversing a 50/50 plate beam splitter used to avoid multiple reflections that may occur in a cube beam splitter. The spectrum of the transmitted beam $T_{sample}(\lambda)$ is coupled via an achromatic doublet lens $L_3$ with focal length f=3 cm to a 50 μm diameter fiber and measured with an optical spectrum analyzer, OSA (Advantest Q8381 A). The transmitted beam is normalized with respect to the beam detected when the sample is removed from the optical path, $T_{ref}(\lambda)$. The reflected beam is coupled to the OSA in the same way as the transmitted beam. The beam reflected from the sample $R_{sample}(\lambda)$ is normalized with respect to the beam reflected from a protected silver mirror $R_{ref}(\lambda)$ (Thorlabs, PF10-03-P01). The distances from the sample to $F_1$ and $F_2$ are kept the same in the transmission and reflection arms, respectively. Finally, the reflection spectrum of the reference mirror $R_{mirror}(\lambda)$ was measured separately (without the beam splitter). The estimated spectral one-sided absorption is $$\mathcal{A}_1(\lambda) = 1 - \frac{T_{sample}(\lambda)}{T_{ref}(\lambda)} - \frac{R_{sample}(\lambda)}{R_{ref}(\lambda)} R_{mirror}(\lambda).$$

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A method for coherent perfect absorption (CPA) with an incoherent optical radiation input, comprising:
   providing a lossy, dielectric thin film characterized by an intrinsic optical absorption over an at least one octave bandwidth;
   providing a resonator structure in which the lossy, dielectric thin film is disposed, wherein the resonator structure comprises two, multi-layer, aperiodic dielectric mirrors characterized by a reflectivity amplitude that increases in-step with increasing wavelength over the at least one octave bandwidth; and
   inputting a single incoherent optical beam having a spectrum over the at least one octave bandwidth to one of a left side and a right side of the resonator structure,
   wherein the lossy, dielectric thin film is characterized by an effective optical absorption over the at least one octave bandwidth that is greater than the intrinsic optical absorption over the at least one octave bandwidth.

2. The method of 1, further comprising providing an asymmetric resonator structure.

3. The method of 1, further comprising inputting a single incoherent optical beam having a spectrum over the at least one octave bandwidth to both the left side and the right side of the resonator structure.

4. An optical structure, comprising:
   an optical resonator comprising two, multi-layer, aperiodic dielectric mirrors;
   a lossy, dielectric thin film characterized by an intrinsic optical absorption over an at least one octave bandwidth, disposed within the resonator structure,
   wherein the resonator structure comprises two, multi-layer, aperiodic dielectric mirrors characterized by a reflectivity amplitude that increases in-step with increasing wavelength over the at least one octave bandwidth,
   further wherein upon a single incoherent beam of optical radiation having a spectrum over the at least one octave bandwidth incident on one of a left side and a right side of the resonator structure, the lossy, dielectric thin film is characterized by an effective optical absorption over the at least one octave bandwidth that is greater than the intrinsic optical absorption over the at least one octave bandwidth.

5. The optical structure of 4, wherein the resonator structure is an asymmetric resonator structure.

6. The optical structure of 4, further wherein upon a single incoherent beam of optical radiation having a spectrum over the at least one octave bandwidth incident on both the left side and the right side of the resonator structure, the lossy, dielectric thin film is characterized by an effective optical absorption over the at least one octave bandwidth that is greater than the intrinsic optical absorption over the at least one octave bandwidth.

\* \* \* \* \*